Sept. 1, 1931.      A. N. ABELSON ET AL      1,821,601
LINE FASTENER
Filed Dec. 1, 1930
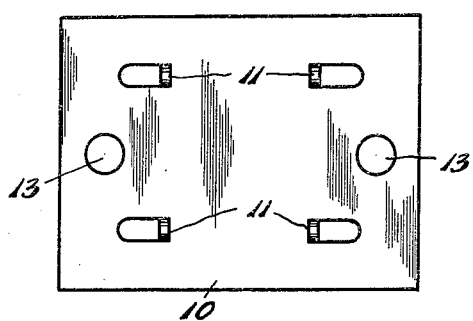
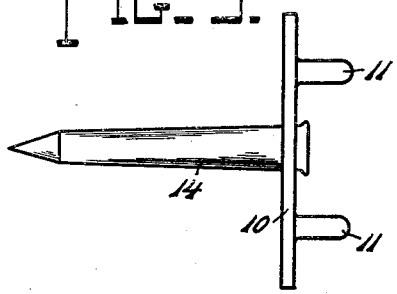
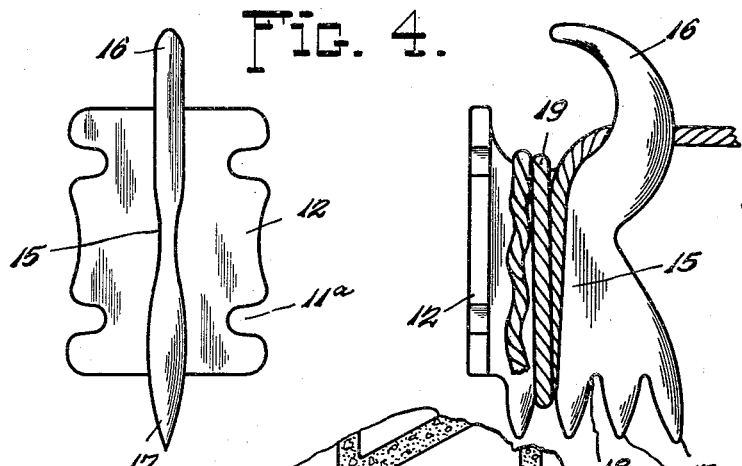
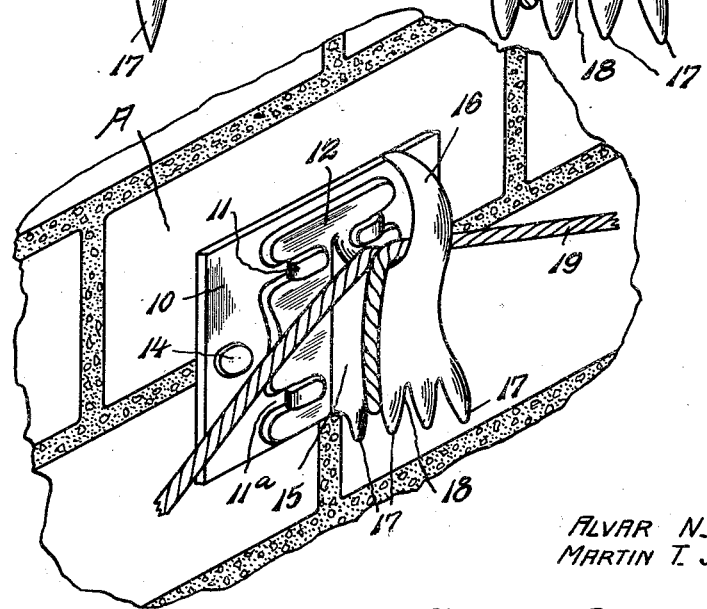
Inventor
ALVAR N. ABELSON.
MARTIN T. JOHNSON.

Patented Sept. 1, 1931

1,821,601

UNITED STATES PATENT OFFICE

ALVAR N. ABELSON AND MARTIN T. JOHNSON, OF CLEVELAND, OHIO

LINE FASTENER

Application filed December 1, 1930. Serial No. 499,377.

The present invention relates to improvements in line fasteners, or devices for securing in position clothes lines or other cords or ropes stretched from point to point for any purpose whatever, and provides a simple construction of this kind which is easily placed firmly in position, and which is readily adaptable for securing the ends of the lines or ropes, in connection with which it is to be used, in place simply and without danger of slipping.

The invention will be readily understood from the following description and taken in connection with the accompanying drawings, in which—

Figure 1 is a perspective view of the line fastener of this invention mounted and secured in operative position.

Figure 2 is a front view of the retaining plate employed in this invention.

Figure 3 is a side view showing one means of attaching the plate in place.

Figure 4 is a fragmentary front elevation of the fastener of this invention.

Figure 5 is a side elevation of the fastener showing the manner in which the end of the line, cord, or rope, is restrained from slipping when applied to the fastener.

Referring more particularly to the drawings, there is illustrated for purposes of example in Figure 1, the wall A of masonry to which the present fastener is attached. This fastener is formed of a plate 10 provided with a plurality of upstanding lugs 11 which may be cut out from the plate 10 and bent at right angles to the plate, these lugs being adapted to fit in corresponding depressions in the abutment portion 12 of the fastener. This abutment portion, as will be seen from the drawings, is provided with a notch 11a at each corner adapted to fit over the respective lugs 11 so that when these lugs are bent backwardly as shown in Figure 1, the fastener is securely and firmly retained in position on plate 10. Plate 10 is also provided with a plurality of holes 13 adapted to receive the fastening spikes 14 which are nailed into the mortar filling the interstices of the masonry as shown in Figure 1, thereby holding the fastening assembly in position.

Integrally formed with the abutment member 12 is a shank 15, the shank having formed on its end the curved hook 16.

On its lower side the shank 15 is provided with a plurality of downwardly projecting horns 17, there being a wedge shaped notch 18 between the adjacent horns.

Having secured the desired number of fasteners in position on a stationary support, by screwing or nailing, one end of a line 19 is securely fastened thereto by simply wrapping the line twice around the fastener as illustrated in Figure 5, letting the end hang freely, the line being passed twice around the shank and through the notches between the horns 17 as will be clearly seen, which operation very effectively prevents slipping of the end. The line to be supported is then passed about each of the other fasteners in the manner shown in Figure 1 by wrapping once around the shank 15 and thence through the notch 18 between horn 17, being then carried over the shank and extended in the direction of the next fastener. The strain upon the line wedges it firmly on the notch and prevents it from slipping in either direction. The end of the line is secured in place by wrapping it around the final fastener as shown in Figure 5. The result of this construction of fastener is that if the line be broken or cut away from the fastener the portion of the cord lying in the notches will be held securely and the remainder of the line will be supported even though the broken part falls loosely. At the same time the line is securely held against accidental detachment, it nevertheless may be very readily removed or loosened from the fastener for the purpose of drawing taut so that it is a very convenient and effective supporting device.

By providing a series of horns 17 with a wedge-shaped notch between each horn, the convenience of the device may be very materially increased, since this construction permits the increasing of the number of turns of the line which can be made about the shank 15 so that a line may be readily spliced in additional lengths if desired by simply duplicating the winding similar to Figure 5 with a new length of line and extending it in the manner above described. It may also be mentioned that the spikes 14 are tapered desirably as shown in Figure 3, and are desirably formed of hardened steel and provided with a relatively sharp point to penetrate and grip the cement mortar between the masonry of the support A, the tapering shape of the spike preventing breaking of the mortar away from the nail. Of course wooden screws can be substituted for the spikes if it is desired to fasten the device to a wooden support.

It is evident that the form of the hook 16 is immaterial and it is also evident that the fastener may be secured in position in many different ways; also it will be evident that many changes in the specifically illustrated and described adaptation of the device may be made without departing from its inventive concept. It will, therefore, be understood that it is intended and desired to embrace within the scope of this invention such modifications and changes as may be necessary to adapt it to varying conditions and uses.

Having thus described our invention, what we claim as new and desire to secure by Letters Patent of the United States, is—

1. A line fastener comprising a plate member adapted to be secured to a stationary support, and a line fastening member adapted to be secured to the plate member, the plate member being provided with a plurality of lugs and the fastening member being provided with means adapted to releasably interlock with the lugs, the fastening member being provided with a shank terminating in an upstanding hook and a series of depending horns, there being wedge-shaped notches between the horns, the fastening member being thereby adapted to secure in locked relation a plurality of turns of line wrapped around the shank, the plate member having means for securing it to a stationary support.

2. A device of the character described, comprising, in combination, a plate element and a hook element, the plate element being provided with a plurality of lugs, the hook element having a portion adapted to engage the plate element and provided with recesses adapted to engage with the lugs of the plate element for interlocking the hook element with the plate element when the lugs are secured into interlocking position.

In testimony whereof we affix our signatures.

ALVAR N. ABELSON.
MARTIN T. JOHNSON.